(12) United States Patent
Chang et al.

(10) Patent No.: US 11,312,347 B2
(45) Date of Patent: Apr. 26, 2022

(54) REAL-TIME PRESSURE-VOLUME CURVE GENERATION FOR A HYDRAULIC SYSTEM

(71) Applicant: Robert Bosch GmbH, Stuttgart (DE)

(72) Inventors: Fu-Long Chang, Ann Arbor, MI (US); Labiba Quaiyum, Northville, MI (US); Qingyuan Li, Superior Township, MI (US); Ravikumar Bhadange, Farmington, MI (US); Wenguang Zhou, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/957,788

(22) PCT Filed: Dec. 21, 2018

(86) PCT No.: PCT/US2018/067303
§ 371 (c)(1),
(2) Date: Jun. 25, 2020

(87) PCT Pub. No.: WO2019/133530
PCT Pub. Date: Jul. 4, 2019

(65) Prior Publication Data
US 2021/0246919 A1 Aug. 12, 2021

Related U.S. Application Data

(60) Provisional application No. 62/610,807, filed on Dec. 27, 2017.

(51) Int. Cl.
| | |
|---|---|
| *F15B 21/02* | (2006.01) |
| *B60T 13/66* | (2006.01) |
| *B60T 17/22* | (2006.01) |

(52) U.S. Cl.
CPC .......... *B60T 13/662* (2013.01); *B60T 17/221* (2013.01); *B60T 2270/406* (2013.01);
(Continued)

(58) Field of Classification Search
CPC ................. B60T 13/662; B60T 17/221; B60T 2270/406; F15B 21/02
See application file for complete search history.

(56) References Cited

U.S. PATENT DOCUMENTS

| | | |
|---|---|---|
| 5,788,337 A | 8/1998 | Eckert |
| 6,851,763 B1 | 2/2005 | Feigel |

(Continued)

FOREIGN PATENT DOCUMENTS

| | | |
|---|---|---|
| CN | 102762422 A | 10/2012 |
| CN | 104981385 A | 10/2015 |

(Continued)

OTHER PUBLICATIONS

International Search Report and Written Opinion for Application No. PCT/US2018/067303 dated Apr. 23, 2019 (15 pages).

(Continued)

*Primary Examiner* — Thomas E Lazo
(74) *Attorney, Agent, or Firm* — Michael Best & Friedrich LLP

(57) ABSTRACT

A system and method for generating a pressure-volume curve for a hydraulic system in a vehicle. The system includes a plunger coupled to the hydraulic system, a pressure sensor configured to detect a pressure of the hydraulic system, and an electronic controller configured to access a prior pressure-volume curve from a memory, generate a signal to move the plunger, receive a pressure from the pressure sensor, generate a new pressure-volume curve based upon the received pressure and a position of the plunger, compare the new pressure-volume curve to the prior pressure-volume curve, in response to the new pressure-volume curve and the prior pressure-volume curve differing by at least a threshold value, replace the prior pressure-volume curve with the new pressure-volume curve (Continued)

in the memory, and actuating the hydraulic system based upon the stored pressure-volume curve.

19 Claims, 4 Drawing Sheets

(52) U.S. Cl.
CPC ....... *F15B 21/02* (2013.01); *F15B 2211/6306* (2013.01); *F15B 2211/6343* (2013.01)

(56) References Cited

U.S. PATENT DOCUMENTS

| | | | |
|---|---|---|---|
| 8,849,536 B2 | 9/2014 | Bohm et al. | |
| 9,358,964 B2* | 6/2016 | Ito | B60T 13/142 |
| 2013/0140879 A1* | 6/2013 | Kneip | B60T 8/4854 |
| | | | 303/14 |
| 2013/0154343 A1* | 6/2013 | Kunz | B60L 7/10 |
| | | | 303/3 |
| 2013/0218407 A1* | 8/2013 | Jungbecker | B60T 13/662 |
| | | | 701/34.4 |
| 2015/0020520 A1* | 1/2015 | Feigel | B60T 8/3655 |
| | | | 60/534 |
| 2015/0166024 A1 | 6/2015 | Biller | |
| 2016/0229383 A1 | 8/2016 | Leiber et al. | |
| 2016/0272174 A1 | 9/2016 | Stelter | |
| 2016/0311422 A1* | 10/2016 | van Zanten | B60T 8/4081 |
| 2017/0158180 A1* | 6/2017 | Kim | B60T 7/042 |
| 2017/0282878 A1 | 10/2017 | Krautter | |

FOREIGN PATENT DOCUMENTS

| | | |
|---|---|---|
| CN | 107428317 A | 12/2017 |
| DE | 102011088942 A1 | 6/2013 |
| FR | 3013657 A1 | 5/2015 |
| WO | 2017144306 A1 | 8/2017 |

OTHER PUBLICATIONS

English Translation of National Intellectual Property Administration, P.R. China, First Office for Application No. 201880083713.5 dated Jan. 10, 2022 (13 pages).

\* cited by examiner

REAL-TIME PRESSURE-VOLUME CURVE GENERATION FOR A HYDRAULIC SYSTEM

CROSS REFERENCE TO RELATED APPLICATIONS

This application claims priority to U.S. Provisional Patent Application No. 62/610,807, filed Dec. 27, 2017 and PCT Application No. PCT/US2018/067303 filed Dec. 21, 2018, the entire contents of both which are incorporated by reference in their entirety.

FIELD

Embodiments relate to a system and method for generating a pressure-volume curve for a hydraulic system.

BACKGROUND

Modern vehicles contain one or more hydraulic systems. For example, braking, suspension, power steering, and other systems may include a hydraulic system. As hydraulic systems in the vehicle are used, components of the hydraulic system may suffer from wear.

SUMMARY

Wear in components of a hydraulic system can be detected by generating a pressure-volume curve for the hydraulic system, where a volume of hydraulic fluid is displaced by a plunger is measured and a pressure of the hydraulic system is taken. As a component suffers more wear, the pressure value for a particular volume value will drop. Therefore, in order to monitor wear of components (among other things), pressure-volume curves can be generated. Pressure-volume curves can be used to characterize the amount of pressure that is needed to actuate components of the hydraulic system, and can be used in a variety of applications: for hydraulic circuit air and leakage monitoring, monitoring of brake rotor and brake pad fading, driver brake request calculations, and others. Thus, a way of generating pressure-volume curves that reflect the current hydraulic component state is required.

Embodiments provide, among other things, methods and systems for generating a pressure-volume curve for a hydraulic system in a vehicle.

One embodiment provides a method for generating a pressure-volume curve for a hydraulic system in a vehicle. The method includes accessing, using an electronic controller, a prior pressure-volume curve from a memory, generating, using the electronic controller, a signal to move a plunger coupled to the hydraulic system, receiving, at the electronic controller, a pressure of the hydraulic system from a pressure sensor, generating, with the electronic controller, a new pressure-volume curve based upon the received pressure and a position of the plunger, comparing, with the electronic controller, the new pressure-volume curve to the prior pressure-volume curve, in response to the new pressure-volume curve and the prior pressure-volume curve differing by at least a threshold value, replace, with the electronic controller, the prior pressure-volume curve with the new pressure-volume curve in the memory, and actuate, with the electronic controller, the hydraulic system based upon the stored pressure-volume curve.

Another embodiment provides a system for generating a pressure-volume curve for a hydraulic system in a vehicle. The system includes a plunger coupled to the hydraulic system, a pressure sensor configured to detect a pressure of the hydraulic system, and an electronic controller configured to access a prior pressure-volume curve from a memory, generate a signal to move the plunger, receive a pressure from the pressure sensor, generate a new pressure-volume curve based upon the received pressure and a position of the plunger, compare the new pressure-volume curve to the prior pressure-volume curve, in response to the new pressure-volume curve and the prior pressure-volume curve differing by at least a threshold value, replacing the prior pressure-volume curve with the new pressure-volume curve in the memory, and actuating the hydraulic system based upon the stored pressure-volume curve.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
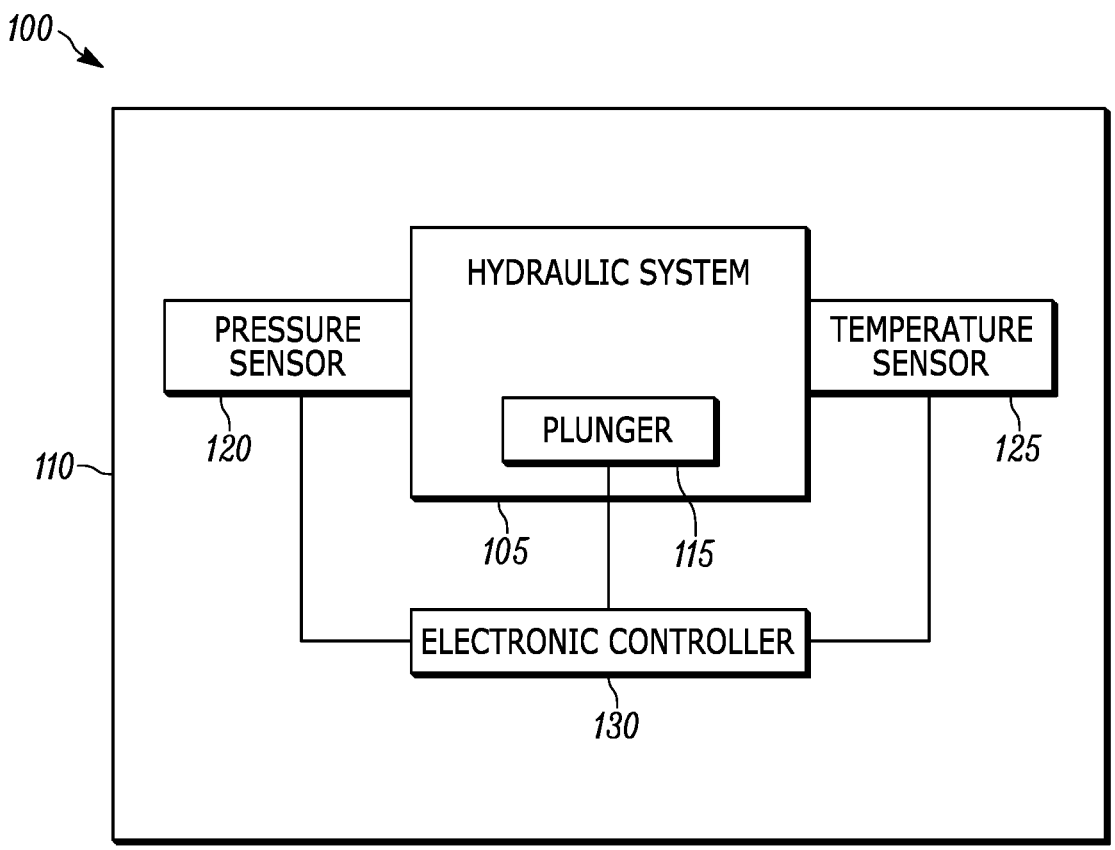
FIG. 1 is a block diagram of a system for generating a pressure-volume curve for a hydraulic system in a vehicle according to one embodiment.

FIG. 1 is a block diagram of a system 100 in a vehicle 105 for generating a pressure-volume curve for a hydraulic system 110. The system 100 includes a plunger 115 coupled to the hydraulic system 110, a pressure sensor 120 configured to detect a pressure in the hydraulic system 110, a temperature sensor 125 configured to detect a temperature in the hydraulic system 110, and an electronic controller 130.

The vehicle 105 may encompass various types and designs of vehicles. For example, the vehicle 105 may be an automobile, a motorcycle, a truck, a semi-tractor, and the like.

The hydraulic system 110 may be a system in the vehicle 110 that is used to transfer energy from flow and pressure. In the example shown, the hydraulic system 105 is a braking system of the vehicle 110. However, in other embodiments, the hydraulic system 105 may be a power steering system, a suspension system, and the like. Additional details regarding the hydraulic system 105 are discussed below in regards to FIG. 3.

The plunger 115 is fluidly coupled to the hydraulic system 110. For example, the plunge 115 is configured to move within a cylinder of the hydraulic system 110 to move hydraulic fluid throughout the hydraulic system 110 and, through this movement of hydraulic fluid, apply pressure to components of the hydraulic system 110. The plunger 115 may be moved by a motor in some embodiments. The motor may be controllable by the electronic controller 130. In some embodiments, the plunger 115 and motor have a dedicated electronic processor. Additional details regarding the plunger 115 are discussed below in regards to FIG. 3.

The pressure sensor 120 is configured to detect a pressure in the hydraulic system 110. For example, the pressure sensor 120 may detect a pressure in a main cylinder of the hydraulic system 110, a slave cylinder of the hydraulic system 110, a reservoir of the hydraulic system 110, or other components of the hydraulic system 110. The pressure sensor 120 is electrically coupled to the electronic controller 130 and is configured to send pressure data to the electronic controller 130.

The temperature sensor 125 is configured to detect a temperature in the hydraulic system 110. For example, the temperature sensor 125 may detect an ambient temperature of the hydraulic system 110, a temperature of hydraulic fluid in the hydraulic system, or a temperature of a specific component of the hydraulic system 110, such as the temperature of a brake disc of a braking system. The temperature sensor 125 is electrically coupled to the electronic controller 130 and is configured to send pressure data to the electronic controller 130.

Figure 2:
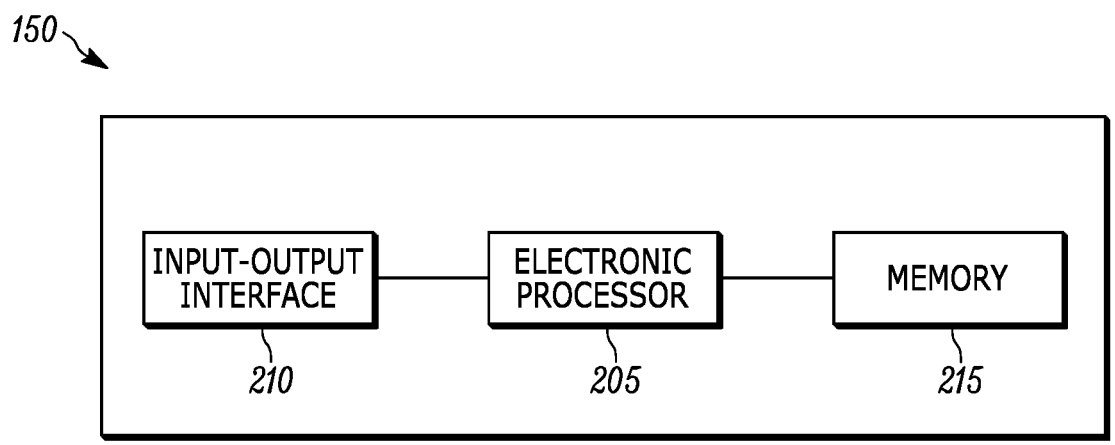
FIG. 2 is a block diagram of an electronic controller according to one embodiment.

The electronic controller 130 is illustrated in FIG. 2. The electronic controller 130 includes a plurality of electrical and electronic components that provide power, operation control, and protection to the components and modules within the electronic controller 130. In the example illustrated, the electronic controller 130 includes an electronic processor 205, an input-output interface 210, and a memory 215. The electronic processor 205 may be a programmable electronic microprocessor, a microcontroller, an application-specific integrated circuit (ASIC), and the like. The electronic processor 205 is communicatively coupled to the input-output interface 210 and the memory 215. The input-output interface 210 allows external electronic components to communicate with the electronic processor 205. The memory 215 may be a non-transitory, machine-readable memory, such as random access memory (RAM), electrically erasable programmable read only memory (EEPROM), and the like.

The electronic controller 130 may be implemented in several independent controllers (for example, programmable electronic control units) each configured to perform specific functions or sub-functions. Additionally, the electronic controller 130 may contain sub-modules that include electronic processors, memory, or ASICs for handling input-output functions, processing of signals, and application of the methods listed below. In other embodiments, the electronic controller 130 includes additional, fewer, or different components.

Figure 3:
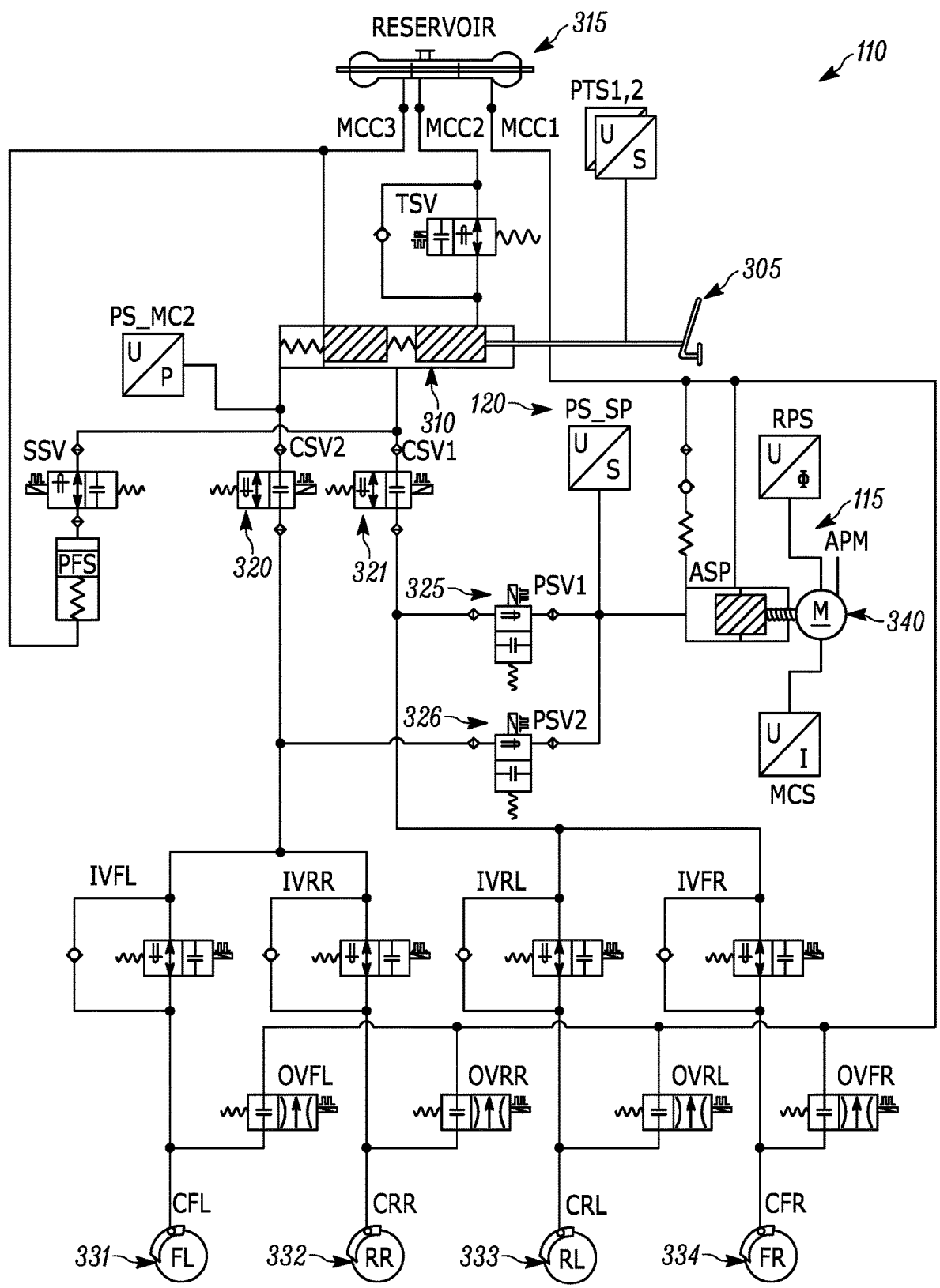
FIG. 3 is an embodiment of a hydraulic system according to one embodiment.

FIG. 3 illustrates the hydraulic system 110 according to one embodiment. The hydraulic system 110, although illustrated as a braking system in FIG. 3, may encompass various other types of hydraulic systems found in a vehicle as discussed above.

The hydraulic system 110 includes several components. For example, the hydraulic system 110 includes a brake pedal 305, a main cylinder 310, a reservoir 315, system valves 320 and 321, plunger valves 325 and 326, brakes 331, 332, 333, and 334, and a pedal travel sensor PTS1,2. When the brake pedal 305 is not depressed, system valves 320 and 321 are open, allowing hydraulic brake fluid from the reservoir 315 to fill the hydraulic system 110. When the brake pedal 305 is depressed, the system valves 320 and 321 close, and the pedal travel sensor PTS1,2 detects a distance displaced and speed of the brake pedal 305 as it is depressed. Based upon the detected distance displaced and speed of the brake pedal 305, the motor 340 is actuated. Any overflow of hydraulic brake fluid is sent back to the reservoir 315.

As stated above, the plunger valves 325 and 326 are closed during normal operation of the hydraulic system 110. When the plunger valves 325 and 326 are closed, no hydraulic brake fluid can reach the plunger 115. When the brake pedal 305 is depressed, the plunger valves 325 and 326 are opened and the system valves 320 and 321 are closed, and the plunger 115 is configured to be moved by a motor 340 to increase the hydraulic pressure of the hydraulic system 110 (for example, in response to the brake pedal 305 being depressed). When the motor 340 is turned on, the plunger 115 is moved at a constant speed equivalent to a desired speed of the motor 340. Movement of the plunger 115 moves the hydraulic brake fluid and increases the hydraulic pressure in the hydraulic system 110 (for example, to apply hydraulic pressure to the brakes 331, 332, 333, 334).

Therefore, it is advantageous that the vehicle 105 is at a standstill (for example, put in park, with a key of the vehicle 105 in an off position, or other situation in which the vehicle 105 is at a complete stop) when performing steps of a method for generating a pressure-volume curve for the hydraulic system 110 as described below, as to not affect the normal braking operation of the hydraulic system 110. By performing the method when the vehicle 105 is at a standstill, no braking is detected by an operator of the vehicle 105, as a) the brake pedal 305 is already depressed and any extra pressure applied is not detected orb) the vehicle 105 is parked and any extra pressure applied is not detected.

Figure 4:
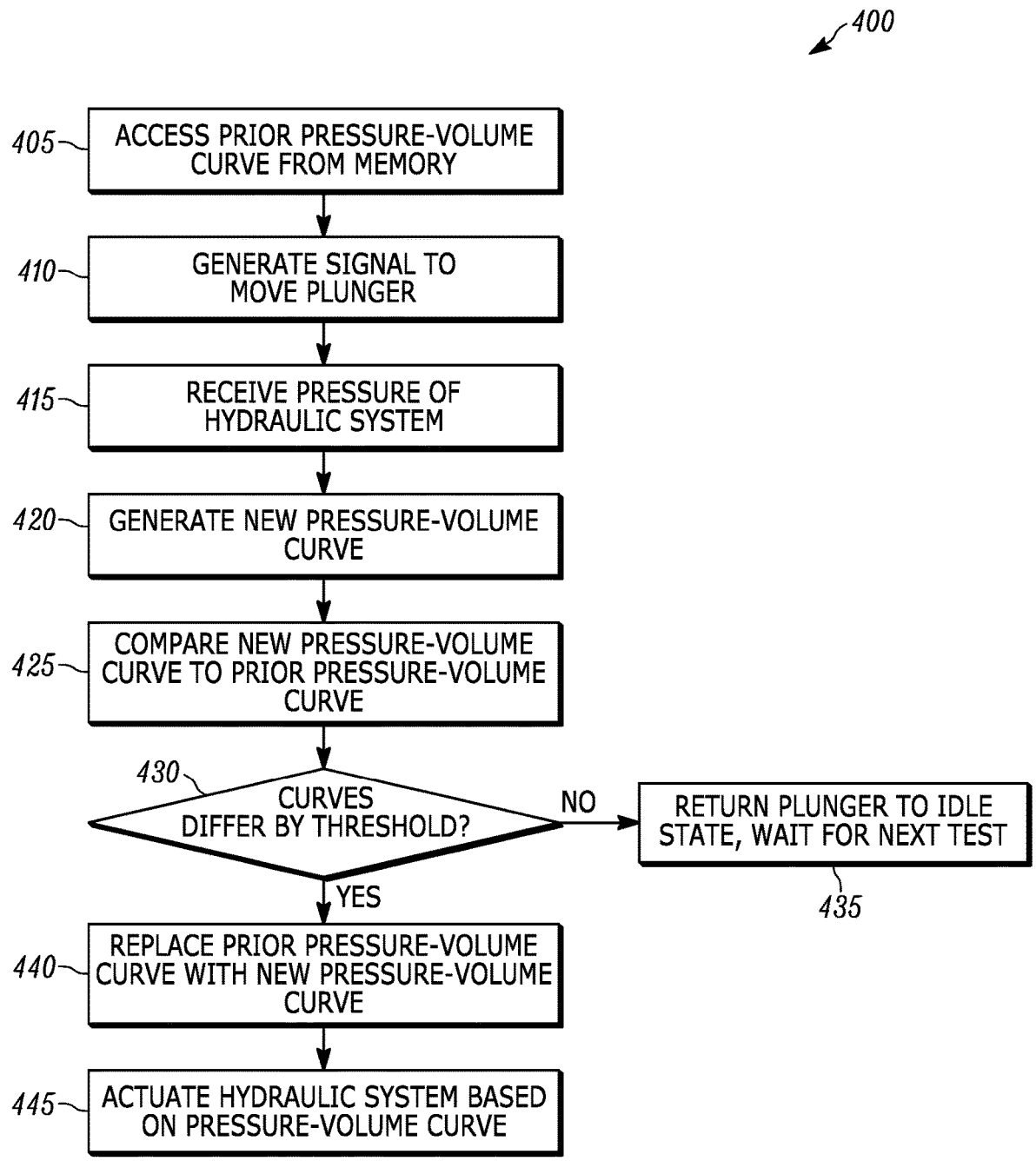
FIG. 4 is a flow chart illustrating a method for generating a pressure-volume curve for a hydraulic system in a vehicle according to one embodiment.

FIG. 4 illustrates a flow chart of a method 400 for generating a pressure-volume curve for the hydraulic system 110 according to one embodiment. The method 400 is performed when the vehicle 105 is at a standstill, in some embodiments, so that normal braking operation of the hydraulic system 110 is not interrupted during the performance of the method 400. The method 400 includes accessing, with the electronic controller 130, a prior PV curve from the memory 215 (at block 405). The prior PV curve may be stored in the memory 215 upon manufacture of the vehicle 105 and may be indicative of an original equipment manufacturer (OEM) component's PV curve. In other embodiments, if new components have been installed on the vehicle 105 (such as new brake calipers or brake pads), the prior PV curve reflects the PV curve of the newly-installed components. In further embodiments, the prior PV curve is generated using the method 400 and stored for later use (as described below).

Figure 5:
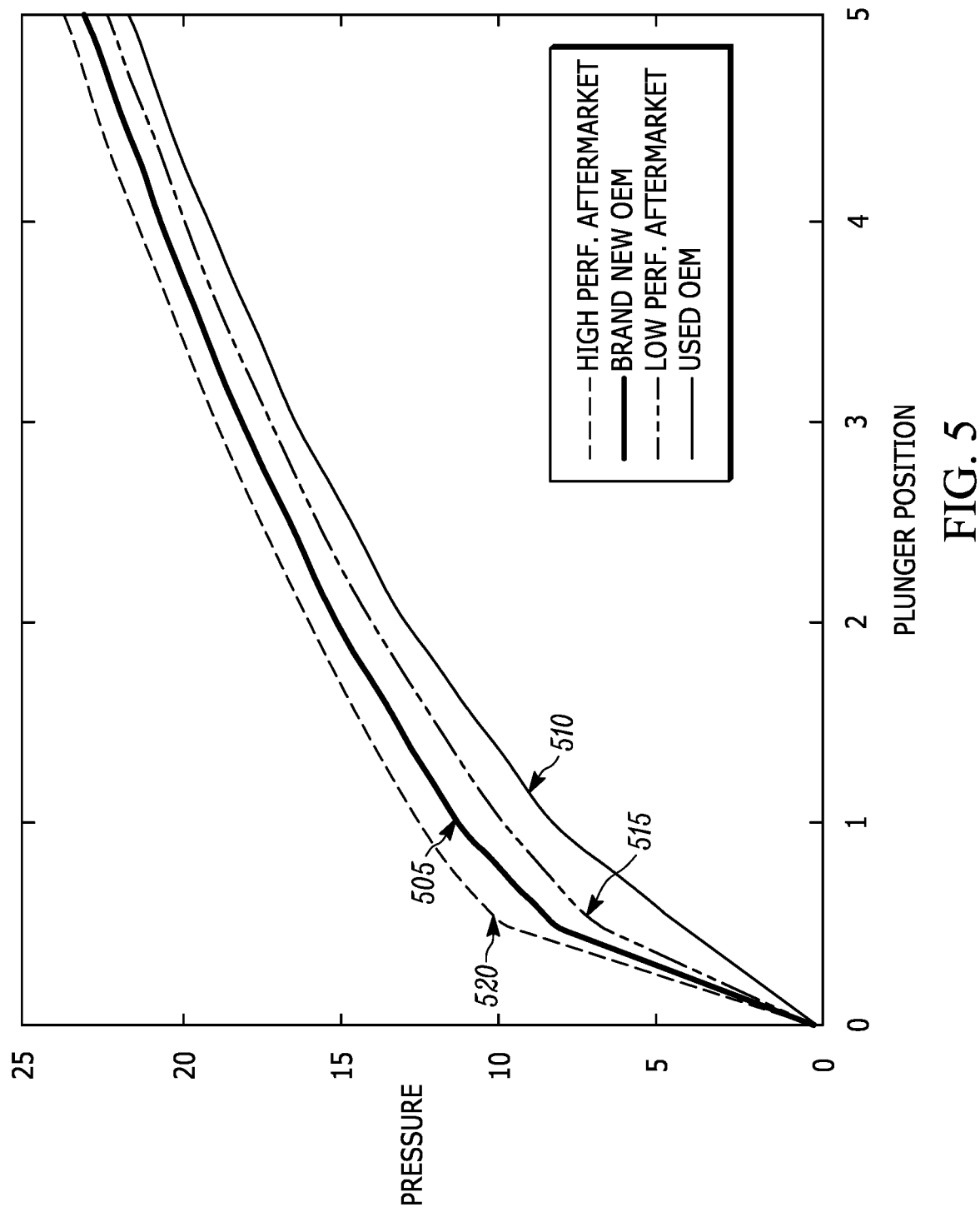
FIG. 5 illustrates a comparison of pressure-volume curves according to one embodiment.

Different components at different states of wear generate different PV curves. For example, FIG. 5 illustrates a comparison of component PV curves.

A brand new OEM component curve 505 is the curve that is generated when a component is first installed during manufacture of the vehicle 105. As the component suffers wear, the pressure values begin to drop. The PV curve generated when the component suffers wear may be a used OEM curve 510. As shown, the pressure values decrease as the component suffers more wear.

The component may be replaced by a non-OEM component. For example, if a component suffers a failure, a user of the vehicle 105 may have to replace the component with what is available at a repair facility or on the open market. A replacement component may be of lesser quality than the OEM component and may therefore generate a low performance aftermarket PV curve 515. In contrast, if the user of the vehicle 105 has knowledge of hydraulic components, the user may want to replace the OEM component with a high performance aftermarket component, which may generate a high performance aftermarket PV curve 520.

Returning now to FIG. 4, the method 400 also includes generating, with the electronic controller 130, a signal to move the plunger 115 (at block 410). In one embodiment, the signal represents a constant speed at which the plunger 115 is to be moved. The signal is sent to the motor 340 and the motor 340 then moves the plunger 115 at the defined constant speed, displacing the hydraulic fluid by a volume. The volume that is displaced by the plunger 115 is determined by a surface area of the plunger 115 (which is known and may be stored in the memory 215) and by a change in a position of the plunger 115. By multiplying the surface area of the plunger 115 and the change in position of the plunger 115, the electronic controller 130 can determine the volume displaced by the plunger 115.

The electronic controller 130 receives a pressure from the pressure sensor 120 (at block 415). As described above, the pressure may be of the hydraulic system 110 as a whole or of an individual component of the hydraulic system 110. In some embodiments, at block 415, the electronic controller also receives a temperature from the temperature sensor 120. As described above, the temperature may be an ambient temperature of the hydraulic system 110, a temperature of hydraulic fluid in the hydraulic system 110, a temperature of a component of the hydraulic system 110, and the like. The electronic controller 130 may save the pressure and the temperature to the memory 215 temporarily to generate a PV curve (as discussed below). The electronic controller 130 may be configured to collect pressure and volume data to generate the PV curve indefinitely in some embodiments. In other embodiments, the electronic controller 130 may collect pressure and volume data for a predefined period of time or until a predefined volume or pressure value is calculated or received.

In some embodiments, the pressure sensor 120 sends continuous pressure data to the electronic controller 130 such that every position of the plunger 115 (and therefore every volume) has an associated pressure value. The temperature sensor 125 may send continuous temperature data to the electronic controller 130 in a similar manner.

The method 400 also includes generating, with the electronic controller 130, a new PV curve based upon the received pressure and the volume displaced by the plunger 115 (at block 420). The electronic controller 130 may determine a plurality of pressure-volume points (the pressure measured at a certain volume) in order to generate the new PV curve. The new PV curve may be immediately stored into memory 215. In some embodiments, the new PV curve is instead stored in a separate temporary memory in order to compare the new PV curve to the prior PV curve (as discussed below).

The method 400 includes comparing, with the electronic controller 130, the new PV curve and the prior PV curve (at block 425). In some embodiments, the new PV curve and the prior PV curve are only compared once the pressure detected by the pressure sensor 120 is above a certain pressure threshold. The pressure threshold may be indicative of an amount of pressure needed to actuate a component of the hydraulic system 110.

If the pressure threshold is exceeded, the electronic controller 130 is configured to compare individual pressure-volume points between the prior PV curve and the new PV curve. For example, the electronic controller 130 determines a pressure value that the prior PV curve and the new PV curve have in common and compares the volume values of the prior PV curve and the new PV curve measured at that pressure value. The electronic controller 130 may be configured to compare only one pressure-volume point. In other embodiments, the electronic controller 130 compares a plurality of pressure-volume points from the prior PV curve and the new PV curve.

In one embodiment, the electronic controller 130 compares the plurality of pressure-volume points from the prior PV curve and the new PV curve by finding pressure values shared between the prior PV curve and the new PV curve and comparing the volume values at the pressure values. The electronic controller 130 may subtract the volume value of the new PV curve from the volume value of the prior PV curve to produce a difference between the prior PV curve and the new PV curve. The difference between the prior PV curve the new PV curve may then be compared to a threshold value to determine if the difference exceeds the threshold value (at block 430).

The threshold value may be indicative of wear of a component of the hydraulic system 110. For example, if the threshold value is exceeded, a component of the hydraulic system may have experienced enough wear that it may affect functionality of the hydraulic system 110 (for example, a brake pad is worn down and may affect how much force is required to effectively brake the vehicle 105).

The difference of the volumes of the prior PV curve and the new PV curve at the pressure values is used to determine how much hydraulic force is necessary to actuate the component of the hydraulic system 110. For example, as the component wears down, a larger displacement of volume (and therefore a larger application of force from an input device such as the brake pedal 305) is necessary to achieve the same hydraulic pressure in the hydraulic system 110.

In some embodiments, only one difference between a pressure-volume point of the prior PV curve and the new PV curve is determined. In other embodiments, a plurality of differences between a plurality of pressure-volume points of the prior PV curve and the new PV curve are determined. Each difference may be compared to the same threshold value. In some embodiments, different threshold values exist for different pressure values, and the difference for each pressure value is compared to the threshold value for that particular pressure value.

If the difference between the prior PV curve and the new PV curve is below the threshold value (or if a number of differences between a plurality of pressure-volume points are below their respective threshold values), the plunger 115 is returned to an idle state (retracted by the motor 340 to an original position of the plunger 115) based upon a generated signal from the electronic controller 1300 and the system 100 resets until the method 400 is to be performed again (at block 435).

However, if the difference between the prior PV curve and the new PV curve is above the threshold value (or if a number of differences between a plurality of pressure-volume points are above their respective threshold values), the electronic controller 130 is configured to replace the prior PV curve with the new PV curve in the memory 215. By replacing the prior PV curve with the new PV curve, functionality of the vehicle 105 that relies on using a PV curve will have access to the most updated PV curve (the new PV curve) that reflects the most recent state of component wear.

In some embodiments, in addition to replacing the prior PV curve in the memory 215 with the new PV curve, the electronic controller 130 may be further configured to replace the PV curve in other memories that are components of systems in the vehicle 105. For example, if the prior PV curve is used for braking functions, the electronic controller 130 may replace the prior PV curve with the new PV curve in all memories associated with braking systems in the vehicle 105.

In some embodiments, the electronic controller 130 may be further configured to output the new PV curve to a display. For example, the electronic controller 130 may output the new PV curve to a display on the dashboard of a vehicle or to a display electronically coupled to the electronic controller 130 (such as a display screen of a maintenance device used in a repair facility). In other embodiments, the electronic controller 130 transmits the new PV curve to a remote location for viewing or storage in a memory via a wireless transceiver. This may allow a repair technician to view the new PV curve remotely or notify an operator of the vehicle 105 that the PV curve has changed.

The method 400 also includes actuating, using the electronic controller 130, the hydraulic system 110 based on the stored PV curve (at block 445). The electronic controller 130 may access the stored PV curve (the new PV curve stored in the memory 215 at block 440, in some embodiments) and actuate a component of the hydraulic system 110 based upon the stored PV curve. For example, the electronic controller 130 may access the stored PV curve to determine a pressure to apply to a brake, the amount of volume to move a plunger to apply a braking pressure to a brake, and the like. The electronic controller 130 may be configured to determine the volume or the pressure from the stored PV curve. The electronic controller 130 then sends a signal to the hydraulic system 110 to actuate the component based upon the volume or pressure determined from the stored PV curve.

Therefore, embodiments herein provide a system and method for generating a pressure-volume curve for a hydraulic system in a vehicle.

Various features, advantages, and embodiments are set forth in the following claims.

What is claimed is:

1. A system (100) for generating a pressure-volume curve for a hydraulic system (110) in a vehicle (105), the system (100) comprising:
    a plunger (115) coupled to the hydraulic system (110),
    a pressure sensor (120) configured to detect a pressure of the hydraulic system (110), and
    an electronic controller (130) configured to
        access a prior pressure-volume curve from a memory (215),
        generate a signal to move the plunger (115),
        receive a pressure from the pressure sensor (120),
        generate a new pressure-volume curve based upon the received pressure and a position of the plunger (115),
        compare the new pressure-volume curve to the prior pressure-volume curve,
        in response to the new pressure-volume curve and the prior pressure-volume curve differing by at least a threshold value, replace the prior pressure-volume curve with the new pressure-volume curve in the memory (215), and
        actuate the hydraulic system (110) based upon the stored pressure-volume curve.

2. The system (100) of claim 1, wherein the plunger (115) is moved at a constant rate.

3. The system (100) of claim 1, wherein the volume is calculated based upon the plunger position and a plunger surface area.

4. The system (100) of claim 1, wherein the new pressure-volume curve is compared to the prior pressure-volume curve when the pressure of the hydraulic system (110) is above a pressure threshold.

5. The system (100) of claim 1, wherein the new pressure-volume curve is compared to the prior pressure-volume curve at a plurality of pressure points.

6. The system (100) of claim 1, wherein a volume at a pressure value of the prior pressure-volume curve is subtracted from a volume of the new pressure-volume curve at the same pressure value and compared to the threshold value.

7. The system (100) of claim 1, wherein the memory (215) is an electrically erasable programmable read-only memory (EEPROM).

8. The system (100) of claim 1, further comprising a temperature sensor (125) to detect a temperature of the hydraulic system (110).

9. The system of claim 8, wherein the electronic controller (130) is further configured to utilize the temperature to generate the pressure-volume curve.

10. A system (100) for generating a pressure-volume curve for a hydraulic system (110) in a vehicle (105), the system (100) comprising:
    a plunger (115) coupled to the hydraulic system (110),
    a pressure sensor (120) configured to detect a pressure of the hydraulic system (110), and
    an electronic controller (130) configured to
        access a prior pressure-volume curve from a memory (215),
        generate a signal to move the plunger (115),
        receive a pressure from the pressure sensor (120),
        generate a new pressure-volume curve based upon the received pressure and a position of the plunger (115),
        compare the new pressure-volume curve to the prior pressure-volume curve,
        in response to the new pressure-volume curve and the prior pressure-volume curve differing by at least a threshold value, replace the prior pressure-volume curve with the new pressure-volume curve in the memory (215), and
        actuate the hydraulic system (110) based upon the stored pressure-volume curve, wherein the vehicle (105) is at a standstill.

11. A method (400) for generating a pressure-volume curve for a hydraulic system (110) in a vehicle (105), the method (400) comprising:

accessing, using an electronic controller (130), a prior pressure-volume curve from a memory (215), generating, using the electronic controller (130), a signal to move a plunger (115) coupled to the hydraulic system (110), receiving, at the electronic controller (130), a pressure of the hydraulic system (110) from a pressure sensor (120), generating, with the electronic controller (130), a new pressure-volume curve based upon the received pressure and a position of the plunger (115), comparing, with the electronic controller (130), the new pressure-volume curve to the prior pressure-volume curve, in response to the new pressure-volume curve and the prior pressure-volume curve differing by at least a threshold value, replacing, with the electronic controller (130), the prior pressure-volume curve with the new pressure-volume curve in the memory (215), and actuating, with the electronic controller (130), the hydraulic system (110) based on the stored pressure-volume curve.

12. The method (400) of claim 11, wherein the method (400) is performed while the vehicle (105) is at a standstill.

13. The method of claim 11, wherein the new pressure-volume curve is compared to the prior pressure-volume curve at a plurality of pressure points.

14. The method of claim 13, wherein a volume of the prior pressure-volume curve at each of the plurality of pressure points is subtracted from a volume of the new pressure-volume curve and compared to the threshold value.

15. The method of claim 11, further comprising receiving, with the electronic controller (130), a temperature from a temperature sensor (125), wherein generating the new pressure-volume curve further includes utilizing the temperature to generate the new pressure-volume curve.

16. The method of claim 11, wherein the plunger is moved at a constant rate.

17. The method of claim 11, wherein the volume is calculated based upon the plunger position and a plunger surface area.

18. The method of claim 11, wherein the new pressure-volume curve is compared to the prior pressure-volume curve when the pressure of the hydraulic system is above a pressure threshold.

19. The method of claim 11, wherein the memory is an electrically erasable programmable read-only memory (EEPROM).

* * * * *